(12) United States Patent
Geue et al.

(10) Patent No.: US 11,441,567 B2
(45) Date of Patent: Sep. 13, 2022

(54) PUMP

(71) Applicant: Hella GmbH & Co. KGaA, Lippstadt (DE)

(72) Inventors: Ingo Geue, Bad Sassendorf (DE); Alexander Happe, Warstein (DE); Theodor Hüser, Geseke (DE); Norbert Thonemann, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 276 days.

(21) Appl. No.: 16/491,587

(22) PCT Filed: Mar. 1, 2018

(86) PCT No.: PCT/EP2018/055087
§ 371 (c)(1),
(2) Date: Sep. 6, 2019

(87) PCT Pub. No.: WO2018/162326
PCT Pub. Date: Sep. 13, 2018

(65) Prior Publication Data
US 2020/0003215 A1  Jan. 2, 2020

(30) Foreign Application Priority Data
Mar. 8, 2017 (DE) .................... 10 2017 104 837.5

(51) Int. Cl.
*F04D 13/06* (2006.01)
*F04D 29/02* (2006.01)
(Continued)

(52) U.S. Cl.
CPC ........... *F04D 13/06* (2013.01); *F04D 13/064* (2013.01); *F04D 29/026* (2013.01); *H02K 1/02* (2013.01);
(Continued)

(58) Field of Classification Search
CPC ............ H02K 15/02; H02K 1/02; H02K 5/12; H02K 15/00; H02K 3/30; H02K 3/44;
(Continued)

(56) References Cited

U.S. PATENT DOCUMENTS 2,761,078 A * 8/1956 McAdam ................ F04C 2/102
310/67 R
7,939,975 B2 * 5/2011 Saga ....................... H02K 15/12
310/43

(Continued)

FOREIGN PATENT DOCUMENTS

CN    102025213 A    4/2011
DE    10243016 A1    10/2003
(Continued)

*Primary Examiner* — Peter J Bertheaud
(74) *Attorney, Agent, or Firm* — Husch Blackwell LLP

(57) ABSTRACT

A pump for liquids is provided, comprising a pump chamber in which a bucket wheel is mounted on a bearing so that it can rotate, and an electric motor with a stator and a rotor. The stator has stator laminations and coils, and is coated with plastic in some parts and an electric/electronic activation device. The pump is intended to have a long service life and at the same time require as little installation space as possible. This is achieved by the stator laminations of the stator being at least in part electroplated.

2 Claims, 1 Drawing Sheet

(51) Int. Cl.
  *H02K 1/02* (2006.01)
  *H02K 3/30* (2006.01)
  *H02K 3/44* (2006.01)
  *H02K 5/12* (2006.01)
  *H02K 15/00* (2006.01)
  *F04D 29/046* (2006.01)
  *F04D 29/22* (2006.01)
  *H02K 1/06* (2006.01)
  *H02K 3/02* (2006.01)

(52) U.S. Cl.
  CPC .............. *H02K 3/30* (2013.01); *H02K 3/44* (2013.01); *H02K 5/12* (2013.01); *H02K 15/00* (2013.01); *F04D 29/046* (2013.01); *F04D 29/2222* (2013.01); *F04D 29/2266* (2013.01); *F05D 2230/90* (2013.01); *H02K 1/06* (2013.01); *H02K 3/02* (2013.01)

(58) Field of Classification Search
  CPC .. H02K 1/06; H02K 3/02; F04D 13/06; F04D 13/064; F04D 29/2222; F04D 29/026; F04D 29/046; B23K 1/0016; C25D 7/00
  See application file for complete search history.

(56) References Cited

U.S. PATENT DOCUMENTS

2004/0062664 A1*  4/2004  Weigold .............. F04D 13/0686
                                                            417/357
2011/0068646 A1   3/2011  Terakubo et al.

FOREIGN PATENT DOCUMENTS

| DE | 102011055599 A1 | 5/2013 |
| DE | 112014004249 T5 | 6/2016 |
| EP | 0504994 A2 | 9/1992 |
| GB | 987300 A | 3/1965 |

* cited by examiner

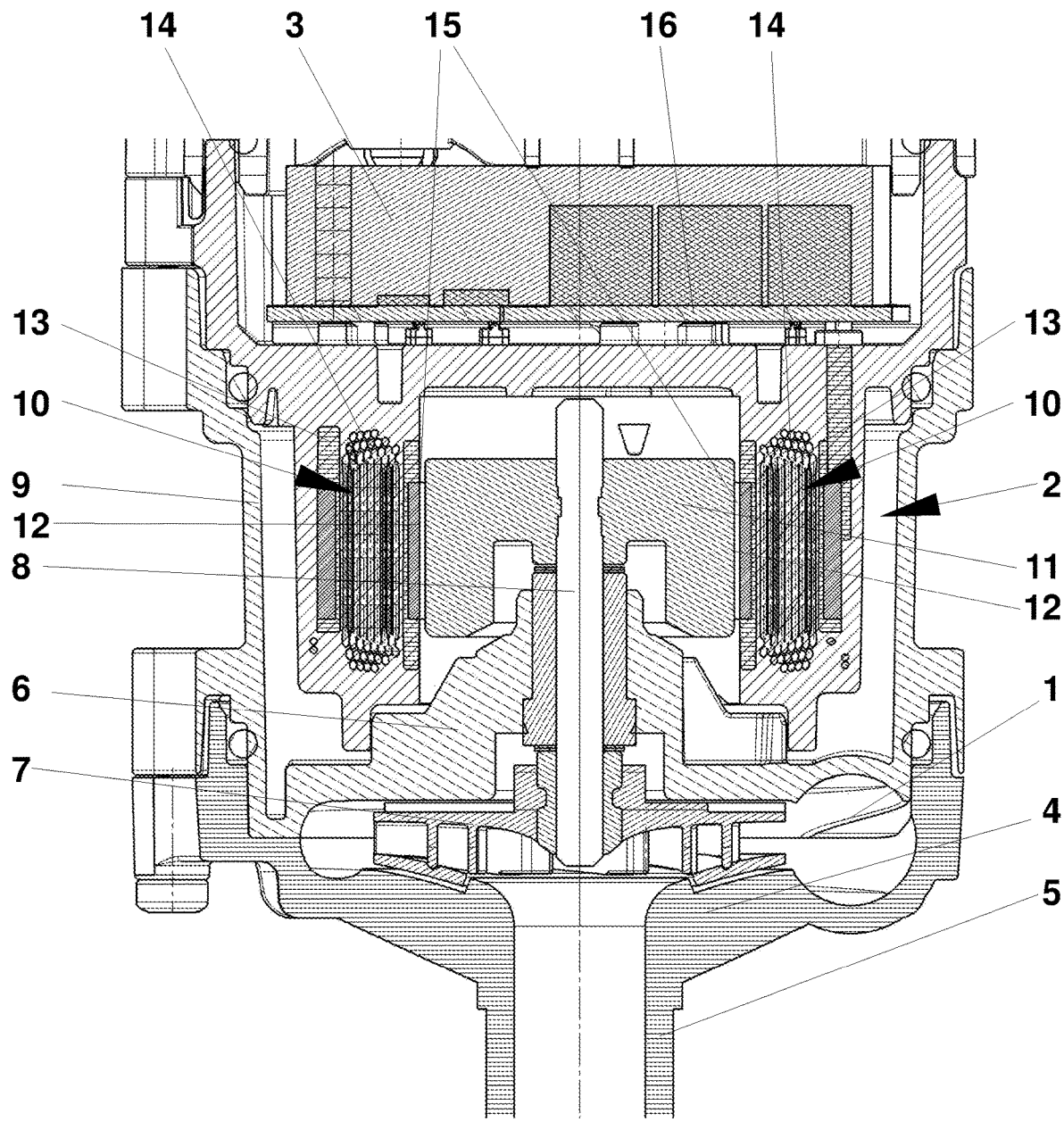

PUMP

CROSS REFERENCE

This application claims priority to PCT Application No. PCT/EP2018/055087, filed 1 Mar. 2018, which itself claims priority to German Application No. 10 2017 104837.5, filed 8 Mar. 2017, the entirety of both of which are hereby incorporated by reference.

FIELD OF THE INVENTION

The invention relates to a pump for liquids, comprising a pump housing, in which a pump rotor is mounted on a bearing so that it can rotate, an electric motor with a stator and a rotor, where the stator has stator laminations and coils and is coated with plastic in some parts and an electric/electronic activation device.

BACKGROUND

The general idea of such pumps are in themselves common knowledge and are used for cooling circuits in motor vehicles, for example. In this context, it is known that parts of the motor liable to corrosion can be coated at least partially in order to increase the pump's durability.

DE 10 2011 055 599 A1 describes a pump for a cooling circuit in a value where a stator and a rotor of an electric motor have been overmolded with plastic. A bucket wheel is of a special design in order to simplify its mounting in an axial direction. The pump has the disadvantage that it has a large magnetic air gap due to the overmolding and consequently requires a relatively large space for installation.

DE 102 43 016 A1 describes an electric motor where an anticorrosive agent applied at least in some areas consists of a film provided with an adhesive. Applying the film involves an elaborate process.

GB 987,300 discloses a pump where a stator and a rotor of an electric motor are coated with polyurethane. Production of the coating involves an elaborate process to ensure that it is tight.

SUMMARY OF THE INVENTION

The task of the invention is to create a pump with an electric motor that ensures a long service life and at the same time requires as little space as possible for installation.

The stator laminations of the stator are electroplated at least in part. A metallic coating agent is selected such that it is resistant to a medium that it will transport. Firstly, this effectively and permanently protects the stator from corrosion, which makes the motor durable, even when it comes into contact with moisture. Secondly, the electroplating can be applied very thinly, so that any magnetic air gap between the stator and a rotor of the electric motor is practically not increased in size.

In one design, those places of the stator laminations that are not coated with the plastic are electroplated. This means that the stator is coated in its entirety and thus protected from corrosion.

In a further design, the electroplated places are allocated to a motor gap. This provides for the thin coating at places that are decisive for the installation space and therefore where the invention has its most positive effect.

In a further design, the stator laminations and contact pins are pretreated with a primer. In this way, particularly good adhesion of all coats is ensured.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 illustrates a longitudinal section through a pump.

DETAILED DESCRIPTION OF THE DRAWINGS

As can be seen from FIG. 1, a pump for fluids comprises a pump chamber 1, an electric motor 2 and an electric/electronic activation device 3.

The pump chamber 1 is, as is already known, formed in a pump housing, which in this case is formed from a lower pump housing section 4 with integrated suction port 5 and an upper pump housing section 6. In the pump chamber 1, a rotating bucket wheel 7 is mounted on a bearing, which bucket wheel is connected coaxially in its rotation axis with one first end of a shaft 8 such that it is torque proof. The shaft 8 is mounted on a bearing in the upper pump housing section 6 so that it can rotate. The pump housing sections 4, 6 are connected to each other such that they can be detached and act as a seal.

The upper pump housing section 6 is simultaneously designed as the base of a motor housing 9, in which the electric motor 2 is arranged.

The electric motor 2 comprises a stator 10 and a rotor 11. A number of permanent magnets are arranged in rotor 11. In an area of a second end of the shaft 8, it is attached in a torque proof manner to said shaft at a distance from the bucket wheel 7. The stator 10 radially surrounds the rotor 11 forming a close gap 12. One width of the gap 12 amounts to, for example, 1 mm and essentially corresponds to a magnetic air gap of an electric motor 2.

The stator 10 comprises a number of stator laminations 13 and of coils 14. With the exception of the front sides 15 of the stator laminations 13 facing the rotor 11, the stator 10 is completely coated with a plastic. This coating serves at the same time as a mounting for the stator 10 in the motor housing, as a cover for the motor housing and as a holder for the activation device 3.

The front sides 15 of the stator laminations 13 facing the rotor 11 are electroplated with a thin layer that cannot be seen from FIG. 1. The layer has a thickness of several μm, e.g. 10 μm to 30 μm.

The pump chamber 1 and the interior of the motor housing 9 are hydraulically connected to each other in such a way that during operating of the pump, the electric motor 2 and, in this case the stator 10 in particular, is immersed in the fluid to be transported and is thus cooled. In this respect, the coatings are reliable protection against corrosion without significantly increasing the size of a magnetic air gap and thus negatively impacting the electrical efficiency of the electric motor 2.

The activation device 3 is arranged in the holder that is formed in the coating of the stator 10 axially opposite the suction port 5 and to be waterproof towards the interior of the motor housing 9. The activation device 3 comprises a printed circuit board 16 and electric/electronic components and is electrically connected firstly with the stator 10 and secondly with the vehicle's onboard electronics via a plug connection.

LIST OF REFERENCE NUMBERS

1 Pump chamber
2 Electric motor

3 Activation device
4 Lower pump housing section
5 Suction port
6 Upper pump housing section
7 Bucket wheel
8 Shaft
9 Motor housing
10 Stator
11 Rotor
12 Gap
13 Stator laminations
14 Coil
15 Front side
16 Printed circuit board

The invention claimed is:

1. A pump for fluids comprising:
a pump chamber;
a bucket wheel mounted in the pump chamber on a bearing for rotation;
an electric motor, the electric motor including a stator and a rotor;
wherein the stator further includes stator laminations and coils, each of the stator laminations including a front side that faces the rotor, a rear side opposite of the front side, and a left side and a right side positioned and located between the front side and the rear side;
wherein the front side of each of the stator laminations is electroplated and is not coated with plastic;
wherein the coils and the rear side, the left side, and the right side of the stator laminations are coated with plastic; and
wherein an electronic activation device is positioned and located in the plastic coating.

2. The pump of claim 1, wherein the electroplated parts are allocated to a motor gap.

* * * * *